United States Patent
Klein et al.

(10) Patent No.: US 12,485,722 B2
(45) Date of Patent: Dec. 2, 2025

(54) HVAC UNIT

(71) Applicant: Mahle International GmbH, Stuttgart (DE)

(72) Inventors: Florian Klein, Bad Liebenzell-Moettlingen (DE); Markus Michael, Ilsfeld (DE); Anja Reiter, Schorndorf (DE); Jochen Schaudt, Hechingen (DE); Sushant Bhoi, Pune (IN)

(73) Assignee: Mahle International GmbH (DE)

( * ) Notice: Subject to any disclaimer, the term of this patent is extended or adjusted under 35 U.S.C. 154(b) by 968 days.

(21) Appl. No.: 17/669,336

(22) Filed: Feb. 10, 2022

(65) Prior Publication Data
US 2022/0250436 A1    Aug. 11, 2022

(30) Foreign Application Priority Data
Feb. 11, 2021   (DE) .......................... 102021201303.1

(51) Int. Cl.
*B60H 1/00*   (2006.01)

(52) U.S. Cl.
CPC ..... *B60H 1/00564* (2013.01); *B60H 1/00735* (2013.01); *B60H 1/00792* (2013.01)

(58) Field of Classification Search
CPC ............ B60H 1/00564; B60H 1/00792; B60H 1/008; B60H 2003/0683
See application file for complete search history.

(56) References Cited

U.S. PATENT DOCUMENTS

| | | | | |
|---|---|---|---|---|
| 5,862,674 | A * | 1/1999 | Ichishi | B60H 1/00792 62/186 |
| 7,900,464 | B2 * | 3/2011 | Aoki | B60H 1/00785 236/44 C |
| 2020/0238925 | A1 * | 7/2020 | Mizuno | B60R 13/0206 |

FOREIGN PATENT DOCUMENTS

| | | |
|---|---|---|
| CN | 209505382 U | 10/2019 |
| CN | 210941246 U | 7/2020 |
| DE | 10 2007 043 358 A1 | 5/2008 |

OTHER PUBLICATIONS

German search report for DE-10201201303.1, dated Sep. 1, 2021.
Chinese First Office Action and Search Report dated Mar. 22, 2025 for Chinese Patent Application No. 2022101284819.

* cited by examiner

*Primary Examiner* — Allen R. B. Schult
(74) *Attorney, Agent, or Firm* — Fishman Stewart PLLC

(57) ABSTRACT

An HVAC unit for a motor vehicle is disclosed. The HVAC unit includes a housing, a sensor device through which air is flowable and an air duct arrangement through which air is flowable. The sensor device is attached to the housing and airflow-connected to the air duct arrangement at an interface. The interface is provided by two connecting pieces of the sensor device aligned in a Z-direction and two receptacles of the air duct arrangement corresponding with the two connecting pieces. The two connecting pieces are disposed on the sensor device and the two receptacles of the air duct arrangement are disposed in the housing. The respective connecting piece engages in the respective receptacle at the interface and is airtight-connected to the respective receptacle.

20 Claims, 6 Drawing Sheets

HVAC UNIT

CROSS-REFERENCE TO RELATED APPLICATION

This application claims priority to German Application No. DE 10 2021 201 303.1 filed on Feb. 11, 2021, the contents of which are hereby incorporated by reference in its entirety.

TECHNICAL FIELD

The invention relates to an HVAC unit for a motor vehicle.

BACKGROUND

HVAC units (HVAC: Heating, Ventilation and Air Conditioning) are already known from the prior art and are used for conditioning air. To take into account the quality of air during conditioning, a sensor device—for example with a fine dust sensor—is often installed in the HVAC unit. The sensor device is often mounted on a housing of the HVAC unit and air is conducted to and from the sensor device via an air duct arrangement—for example via flexible hoses. To ensure the measurement accuracy of the sensor device, air with the lowest possible particle loss should be directed to the sensor device. However, this is often difficult.

SUMMARY

The object of the invention is therefore to specify an improved or at least alternative embodiment for an HVAC unit of the generic type, in which the disadvantages described are overcome.

According to the invention, this object is achieved by the subject matter of the independent claim(s). Advantageous embodiments are the subject matter of the dependent claims.

An HVAC unit for a motor vehicle has a housing, an air duct arrangement through which air can flow, and a sensor device through which air can flow. The sensor device is attached to the housing of the HVAC unit and is airflow-connected to the air duct arrangement at an interface. The interface is formed by two connecting pieces of the sensor device directed in the Z-direction and two receptacles of the air duct arrangement corresponding to the connecting pieces. The connecting pieces are formed on the sensor device and the receptacles of the air duct arrangement are formed in the housing of the HVAC unit. According to the invention, the respective connecting piece engages at the interface in the respective receptacle and is outwardly air-tight-connected thereto. Advantageously, in the HVAC unit according to the invention, the particle loss can be minimized and the measurement accuracy of the sensor device can be improved. In addition, the entry of scattered light into the sensor device can also be reduced, which is particularly advantageous for performing light scattering measurements in the sensor device.

The HVAC unit (HVAC: Heating, Ventilation and Air Conditioning) is primarily concerned with an air conditioning system or a component of the air conditioning system for the motor vehicle. The sensor device may, for example, comprise a fine dust sensor and/or a so-called air quality sensor or be formed by a fine dust sensor and/or a so-called air quality sensor. The one connecting piece and the associated receptacle may direct the air from the air duct arrangement into the sensor device, and the other connecting piece and the associated receptacle may direct the air from the sensor device into the air duct arrangement. An air duct may then be formed in the sensor device to airflow-connect the two connecting pieces of the sensor device. Within the air duct, the parameter determination of air takes place appropriately. The air duct arrangement expediently has two air ducts which lead to or from the sensor device and are airflow-connected to the associated receptacle. The receptacles of the air duct arrangement are formed in the housing of the HVAC unit so that the interface is formed between the housing and the sensor device.

Advantageously, the housing of the HVAC unit can have at least two housing parts, each with a connecting surface. The one housing part and the other housing part abut each other and are firmly connected to each other by the respective connecting surfaces. The air duct arrangement may then be formed, at least in regions, between the two abutting connecting surfaces. The receptacles are then formed in the one housing part and the sensor device is attached to this one housing part. In particular, air ducts can be formed between the two connecting surfaces of the two housing parts, which lead to and from the receptacles of the air duct arrangement.

Advantageously, the sensor device can be clamped between a mounting bracket formed on the housing and the interface in the Z direction, so that the connecting pieces of the sensor device engage with a certain force in the receptacles of the air duct arrangement. Alternatively or additionally, the sensor device can be attached to the housing by means of a screw aligned in the Z-direction and the connecting pieces can be tightened to the receptacles. This allows the connecting pieces of the sensor device to engage with a certain force in the receptacles of the air duct arrangement. Due to the force generated between the respective connecting piece and the respective receptacle, the interface can be better sealed and particle loss can be minimized. Advantageously, this can avoid costly sealing and reduce manufacturing costs.

In addition, a U-shaped air duct can be formed in the sensor device. The air duct airflow-connects the two connecting pieces of the sensor device. The longitudinal centerline of the air duct and the longitudinal centerlines of the connecting pieces merge into one another and lie in a duct plane parallel to the Z direction. The effective direction of the force generated between the respective connecting piece and the respective associated receptacle is also in the duct plane. As a result, the force acts on the respective connecting piece along its longitudinal center axis or centrally or symmetrically, so that the sealing of the interface in the Z direction is maximized. The duct plane may thereby coincide with a center plane of the sensor device or be spaced apart from and parallel to a center plane of the sensor device.

Advantageously, the respective connecting piece of the sensor device can be conical on the outside and the respective associated receptacle of the air duct arrangement can be conical on the inside and correspond to each other in shape and in size. The respective connecting piece tapers symmetrically on the outside along its longitudinal center axis towards the respective receptacle. Advantageously, the taper of the connecting piece may be about 5-10° relative to its longitudinal central axis. The respective receptacle is adapted to the shape of the connecting piece. The conical shape of the connecting pieces and receptacles allows the sensor device to be guided during insertion and simplifies mounting.

Advantageously, a separate guide element can be arranged within the respective receptacle or an integral guide element can be formed. The guide element guides the air from the air duct arrangement into the sensor device and from the sensor device into the air duct arrangement. The guide element—or a so-called baffle—can reduce particle loss when air is deflected at the interface. This also avoids particle accumulation and potential clogging at the interface.

Advantageously, the sensor device can be guided on the housing via a guide unit transverse to the Z-direction and/or in the Z-direction. The guide unit man, for example, be a rib cross which guides the sensor device transversely to the Z direction. Alternatively, the guide unit may be, for example, at least one guide rib that guides the sensor device in the Z direction. In particular, the guide unit can secure the effective direction of the generated force between the respective connecting piece and the receptacle, thereby improving the sealing of the interface. Furthermore, the sensor device can be guided during insertion, thereby simplifying mounting.

Advantageously, the respective connecting pieces and the respective receptacles can each be designed identically to one another, so that the sensor device can be mounted on the housing of the HVAC unit in two positions, each rotated by 180° about the Z direction.

Alternatively, the sensor device may be attached to the housing via a poka-yoke unit that precludes incorrect mounting of the sensor device to the housing. As a result, one of the positions described above is excluded by the poka-yoke unit. In this way, the sensor device can no longer be mounted to the HVAC unit housing rotated 180° about the Z-direction.

If the mounting bracket described above is provided in the HVAC unit, the poka-yoke unit may be formed by at least one pin and at least one rib on the sensor device and at least one aperture for the at least one pin on the mounting bracket. The at least one pin and the at least one rib on the sensor device and the at least one aperture on the mounting bracket are suitably aligned with respect to each other such that, when properly mounted, the at least one pin engages the at least one aperture unimpeded and, when mounted incorrectly, the rib prevents engagement between the at least one pin and the at least one aperture.

Alternatively, the poka-yoke unit may be formed in that the one connecting piece with the associated receptacle is different from the other connecting piece with the associated receptacle. When installed correctly, the respective connecting piece engages the respective associated and matching receptacle, and when installed incorrectly, the respective connecting piece cannot engage the respective non-associated and non-matching receptacle.

Further important features and advantages of the invention will be apparent from the subclaims, drawings and the accompanying figure description based on the drawings.

It goes without saying that the above features, and those to be explained below, can be used not only in the combination indicated in each case, but also in other combinations or on their own, without departing from the scope of the present invention.

Preferred exemplary embodiments of the invention are shown in the drawings and will be explained in more detail in the following description, wherein identical reference numerals refer to identical or similar or functionally identical components.

DETAILED DESCRIPTION

Figure 1:
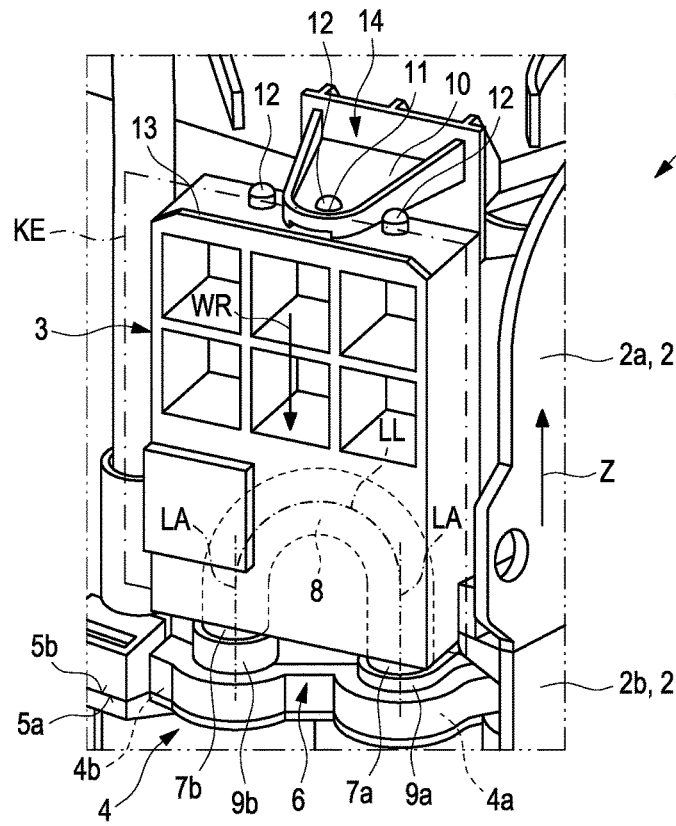
In FIGS. 1 and 2, views of an HVAC unit according to the invention in a first embodiment.
Figure 2:
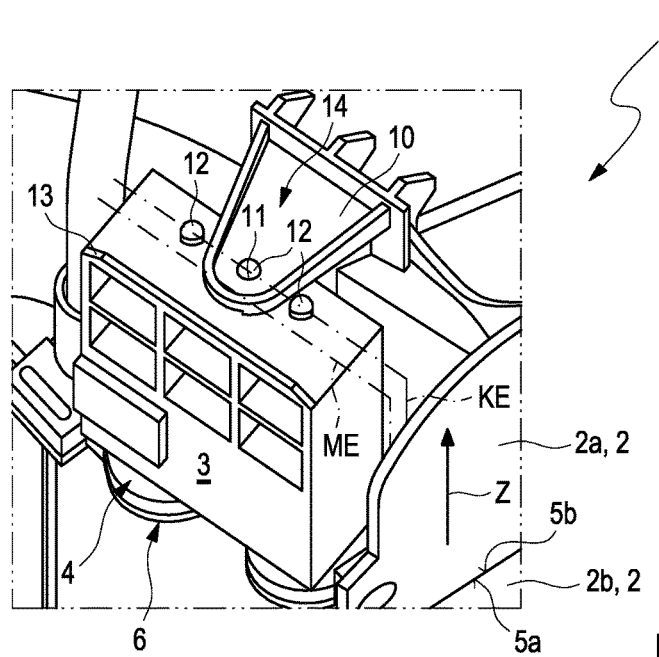

FIG. 1 shows a front view and FIG. 2 shows a top view of an HVAC unit 1 according to the invention for a motor vehicle in a first embodiment. In FIG. 1 and FIG. 2, the elements not visible from the outside are indicated with dashed arrows and/or with dashed lines. The HVAC unit 1 has a housing 2, a sensor device 3 and an air duct arrangement 4. The housing 2 has two housing parts 2a and 2b, each of which abuts against the other by means of a stop surface 5a and 5b and is fixedly connected to one another. The air duct arrangement 4 with air ducts 4a and 4b is formed between the stop surfaces 5a and 5b. The sensor device 3 is attached to the housing 2 of the HVAC unit 1 and is airflow-connected to the air ducts 4a and 4b of the air duct arrangement 4 at an interface 6.

Here, the sensor device 3 has two connecting pieces 7a and 7b directed in the Z direction, which are airflow-connected within the sensor device 3 via a U-shaped air duct 8. The longitudinal centerlines LA of the two connecting pieces 7a and 7b and the longitudinal centerline LL of the air duct 8 merge into one another and lie in a common duct plane KE parallel to the Z direction, as can be seen in FIG. 1. The duct plane KE is arranged parallel to and spaced from a center plane ME of the sensor device 3, as can be seen in FIG. 2.

The air duct arrangement 4 also has two receptacles 9a and 9b, which are formed on the housing part 2a and correlate in shape and size with the connecting pieces 7a and 7b. The interface 6 is formed by the connecting pieces 7a and 7b and the receptacles 9a and 9b, which are airtight-connected to each other. In the HVAC unit 1, air flows through the air duct 4a of the air duct arrangement 4 to the receptacle 9a and via the connecting piece 7a into the air duct 8. In the air duct 8, the parameter determination of air can take place. Air flows from the air duct 8 via the connecting piece 7b to the receptacle 9b and into the air duct 4b.

The sensor device 3 is clamped between a mounting bracket 10 and the interface 6 in the Z direction, so that the connecting pieces 7a and 7b engage with a certain force in the receptacles 9a and 9b. The effective direction WR of the force—see FIG. 1—lies in the duct plane KE, so that a particularly strong seal is achieved at the interface 6. An aperture 11 is formed on the mounting bracket 10 and pins 12 and a rib 13 are formed on the sensor device 3. The rib 13, pins 12 and aperture 11 form a poka-yoke unit 14 of the HVAC unit 1. When the sensor device 3 is properly mounted to the housing 2, the rib 13 faces away from the mounting bracket 10 and one of the center pins 12 engages the aperture 11. If the sensor device 3 is rotated 180° about the Z direction, the rib 13 would prevent engagement between the center pin 12 and the aperture 11 and thereby prevent incorrect mounting.

Figure 3:
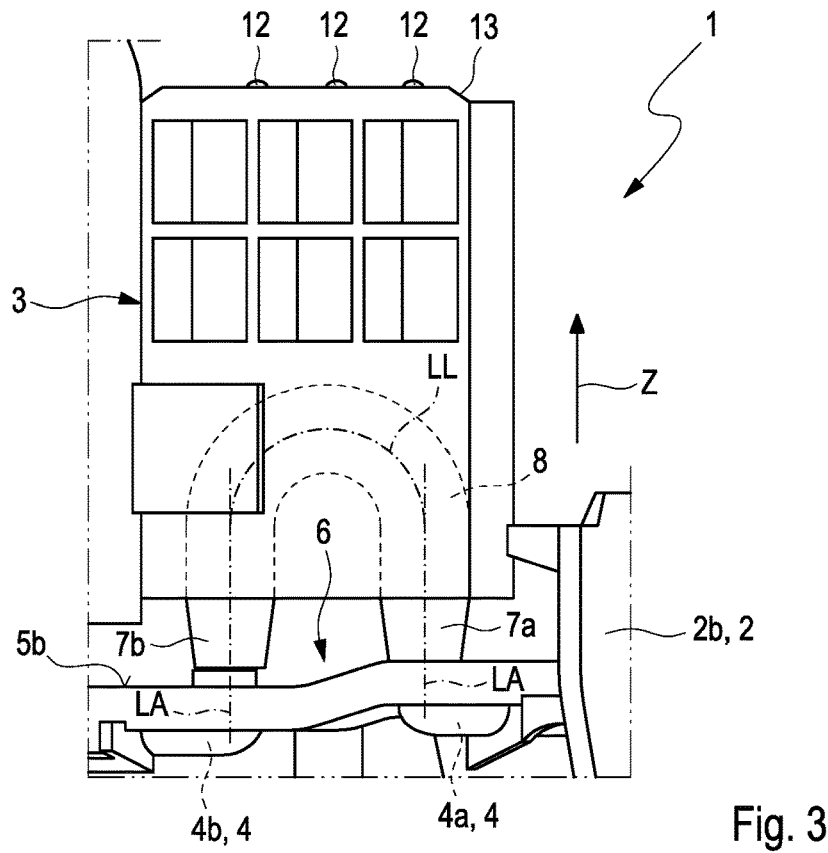
In FIGS. 3 and 4, views of the HVAC unit according to the invention in the first embodiment without a housing part in each case.
Figure 4:
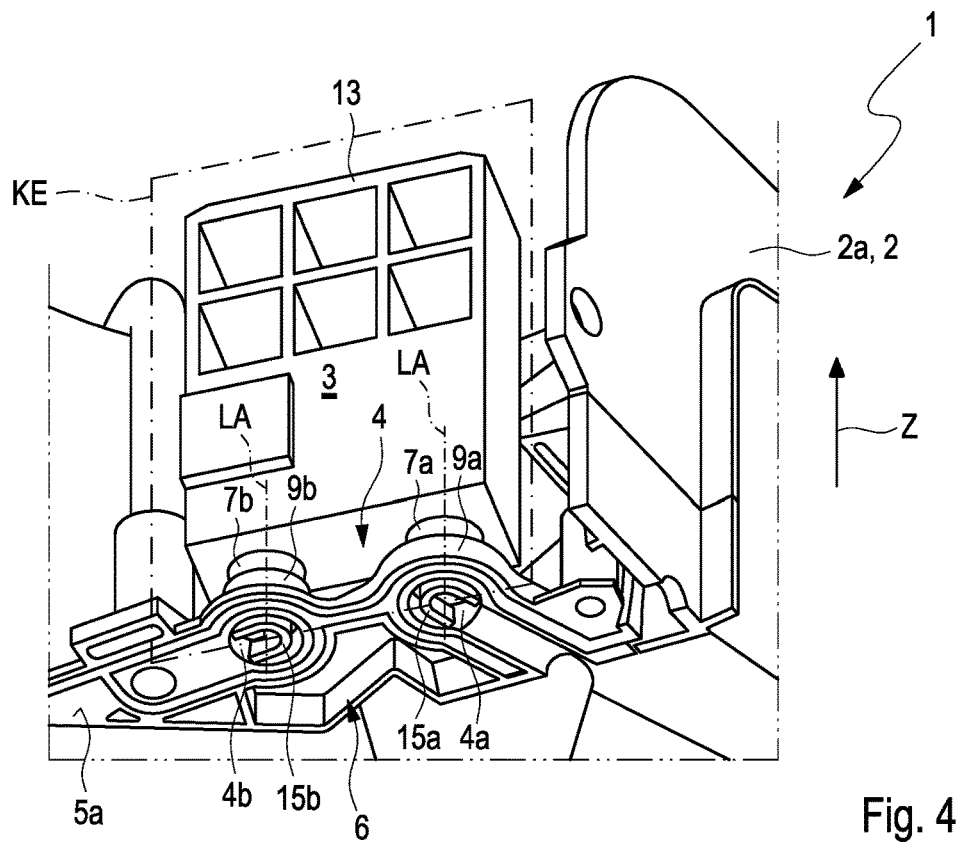

FIG. 3 shows a view of the HVAC unit 1 according to the invention in the first embodiment without the housing part 2a. FIG. 4 shows a view of the HVAC unit 1 according to the invention in the first embodiment without the housing part 2b. In FIGS. 3 and 4, the elements not visible from the outside are indicated with dashed arrows and/or dashed lines. Referring to FIG. 3, the respective connecting piece 7a or 7b has a conical shape or tapers towards the respective receptacle 9a or 9b. The taper of the respective connecting piece 7a or 7b can be approx. 5-10° relative to its longitudinal center axis LA. The shape of the respective receptacle 9a or 9b corresponds to the shape of the respective associated connecting piece 7a or 7b. With reference to FIG. 4, a guide element 15a or 15b—or a so-called baffle—is formed on the housing part 2b in the respective receptacle 9a or 9b. The guide element 15a or 15b can reduce particle loss at the interface 6. This also avoids particle accumulation and potential clogging at the interface 6.

Figure 5:
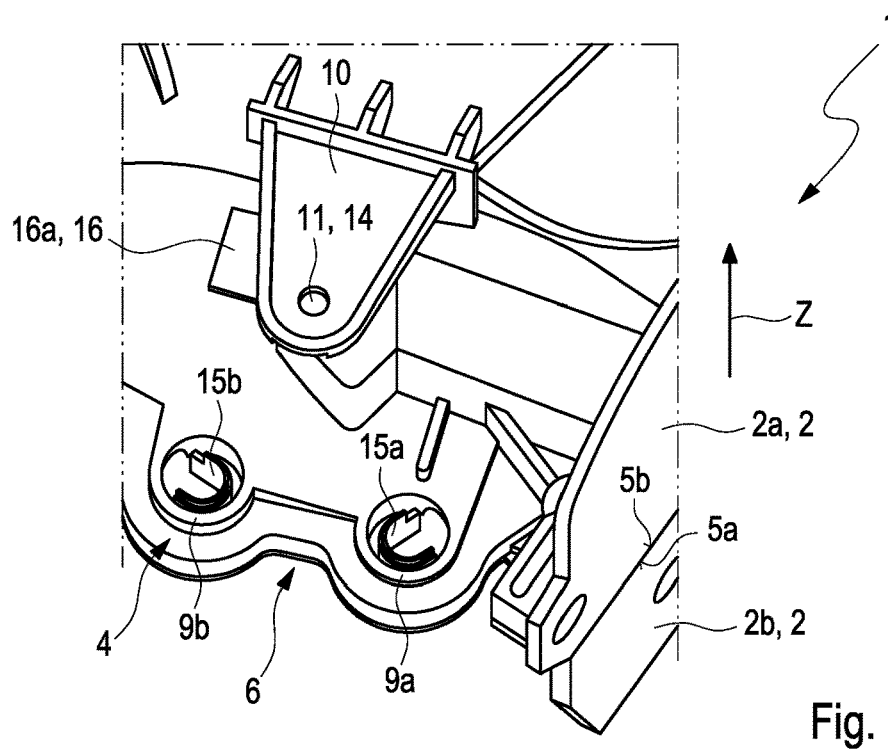
In FIGS. 5 and 6, views of the HVAC unit according to the invention in the first embodiment without a sensor device.
Figure 6:
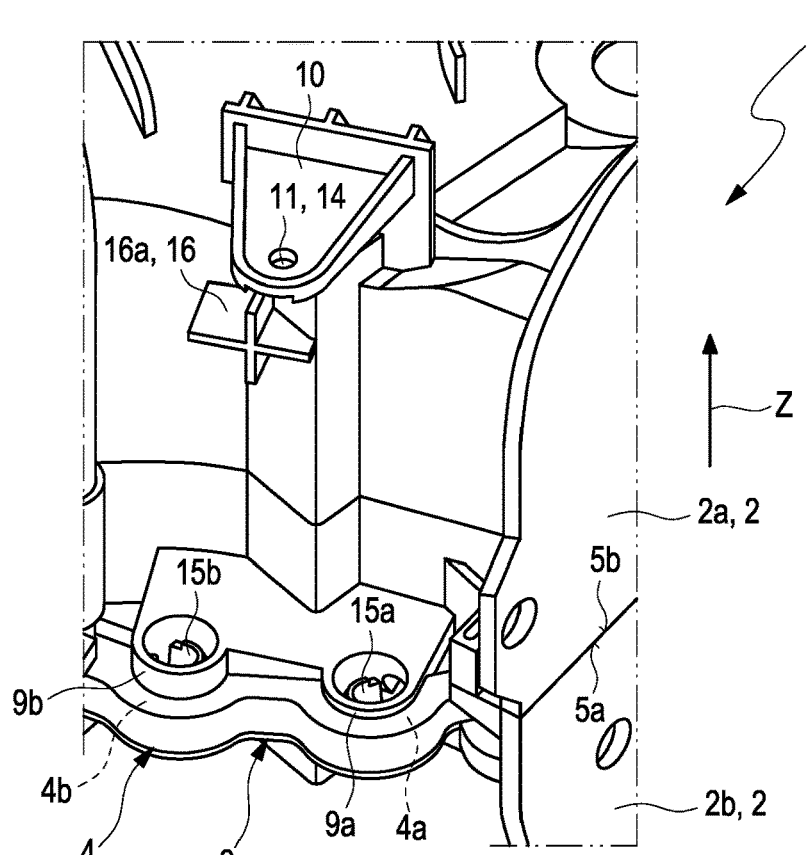

FIGS. 5 and 6 show deviating views of the HVAC unit 1 according to the invention in the first embodiment without the sensor device 3. In FIGS. 5 and 6, the elements that are not visible from the outside are indicated with dashed arrows and/or dashed lines. In FIGS. 5 and 6 in particular, a guide unit 16—in this case a rib cross 16a—can be seen on the housing part 2a, through which the sensor device 3 is guided transversely to the Z direction. The guide unit 16 can simplify the mounting of the sensor device 3.

Figure 7:
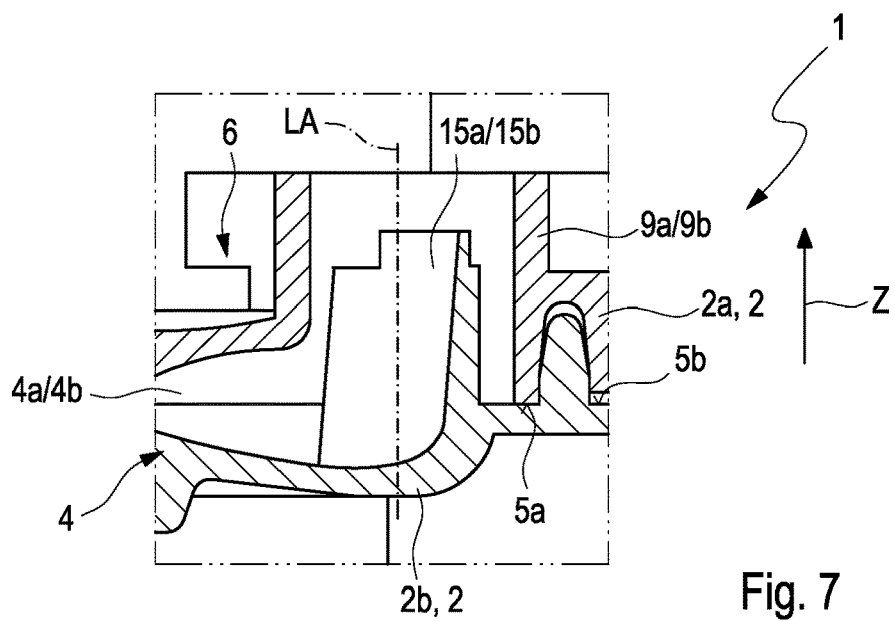
In FIG. 7, a sectional view of the HVAC unit according to the invention in the first embodiment at an interface between the housing and the sensor device.

FIG. 7 shows a sectional view of the HVAC unit 1 according to the invention in the first embodiment at the interface 6. In FIG. 7, the design of the respective guide element 15a or 15b can be seen particularly well.

Figure 8:
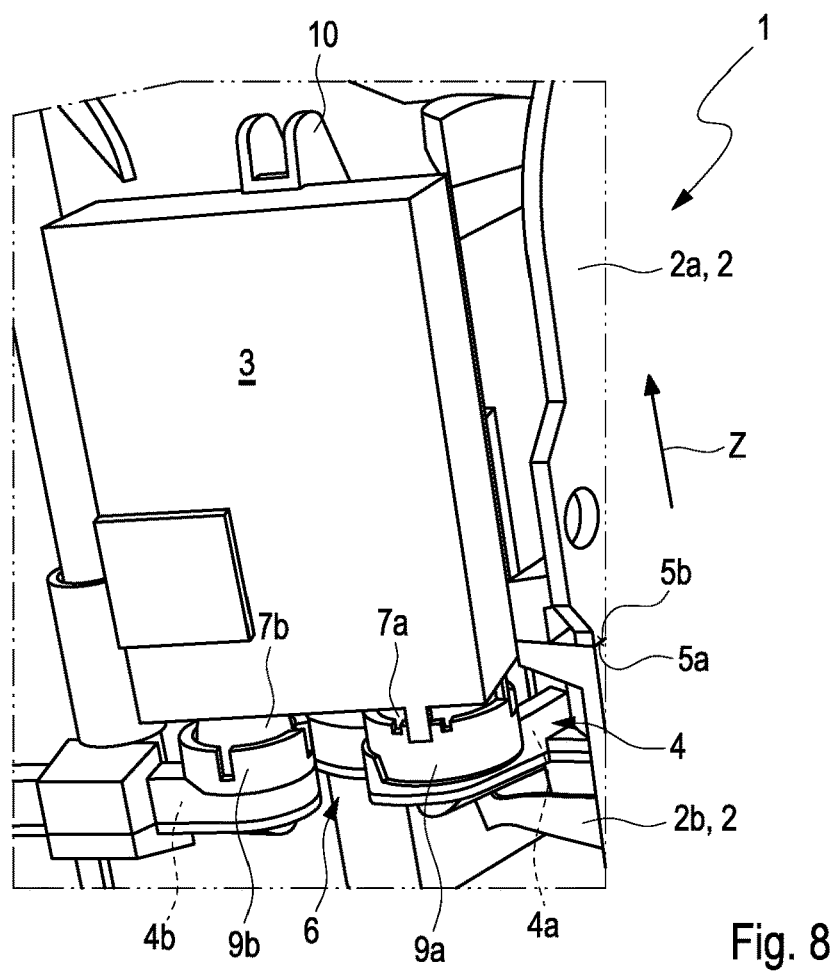
In FIG. 8, a view of the HVAC unit according to the invention in a second embodiment.
Figure 9:
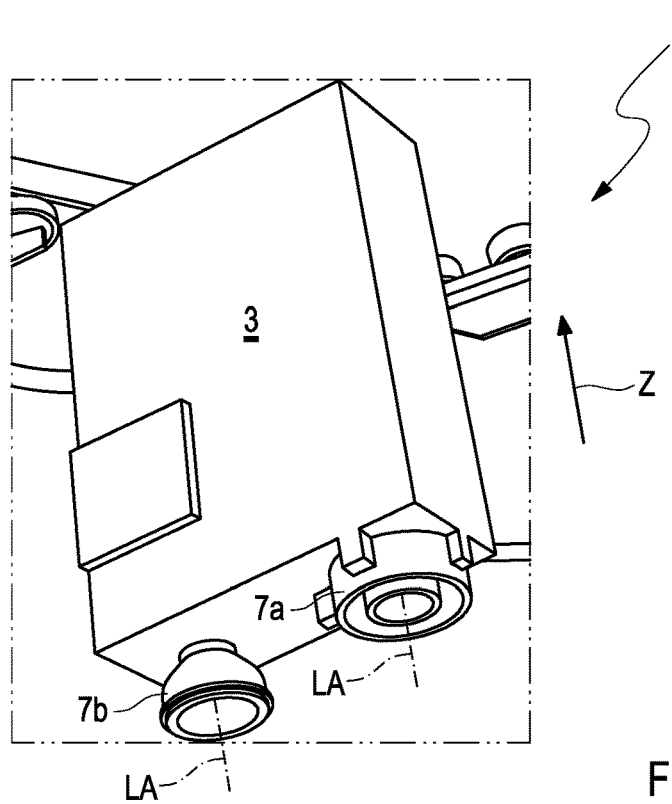
In FIG. 9, a view of the HVAC unit according to the invention in the second embodiment without the housing.
Figure 10:
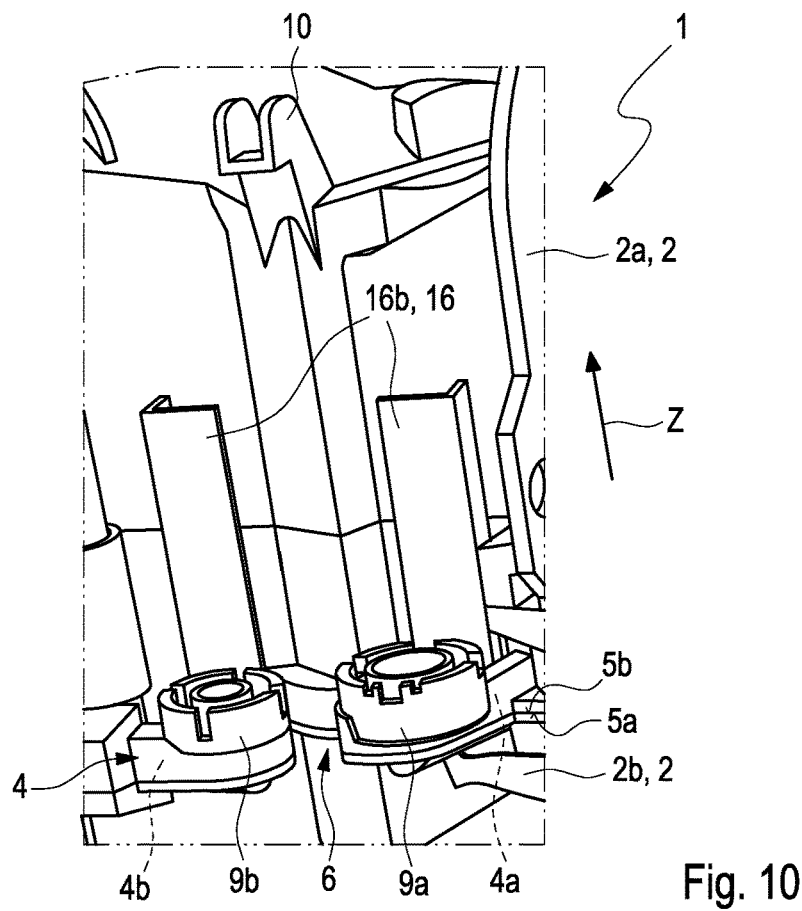
In FIGS. 10 and 11, views of the HVAC unit according to the invention in the second embodiment without the sensor device.
Figure 11:
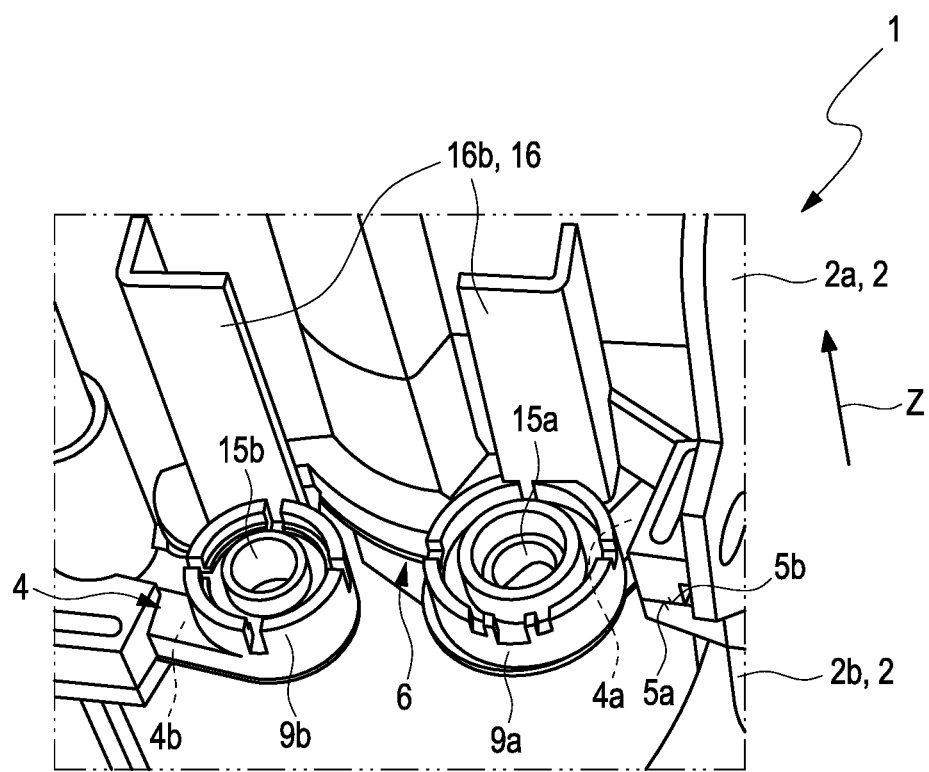

FIG. 8 shows a view of the HVAC unit 1 according to the invention in a second embodiment. FIG. 9 shows a view of the HVAC unit 1 according to the invention in the second embodiment without the housing 2. FIGS. 10 and 11 show views of the HVAC unit 1 according to the invention in the second embodiment without the sensor device 3. In FIGS. 8-11, the elements not visible from the outside are indicated with dashed arrows and/or dashed lines.

In the second embodiment of the HVAC unit 1, the poka-yoke unit 14 is realized by the deviating design of the connecting pieces 7a and 7b as well as the receptacles 9a and 9b, as can be seen particularly well in FIGS. 9 and 11. Accordingly, the sensor device 3 has no rib 13 and no pins 12. The mounting bracket 10 is realized in a simplified manner and does not have an aperture 11. Furthermore, the guide unit 16 is realized by two guide ribs 16b. In all other respects, the second and the first embodiment of the HVAC unit 1 are identical.

The invention claimed is:

1. An HVAC unit for a motor vehicle, comprising:
a housing, a sensor device through which air is flowable and an air duct arrangement through which air is flowable,
the sensor device attached to the housing and airflow-connected to the air duct arrangement at an interface,
the interface provided by two connecting pieces of the sensor device aligned in a Z-direction and two receptacles of the air duct arrangement corresponding with the two connecting pieces,
wherein the two connecting pieces are disposed on the sensor device and the two receptacles of the air duct arrangement are disposed in the housing, and
wherein a respective connecting piece of the two connecting pieces engages in a respective receptacle of the two receptacles at the interface and is airtight-connected to the respective receptacle, and
wherein the respective connection piece together with the respective receptacle defines part of an airflow path of the air duct arrangement.

2. The HVAC unit of claim 1, wherein the sensor device is clamped between a mounting bracket disposed on the housing and the interface in the Z-direction, such that the two connecting pieces of the sensor device engage with a certain force in the two receptacles of the air duct arrangement.

3. The HVAC unit of claim 1, wherein the sensor device is attached to the housing via a screw aligned in the Z-direction and is drawn towards the housing, such that the two connecting pieces of the sensor device engage with a certain force in the two receptacles of the air duct arrangement.

4. The HVAC unit of claim 2, wherein:
a U-shaped air duct is formed in the sensor device and airflow-connects the two connecting pieces of the sensor device to one another,
a longitudinal center line of the U-shaped air duct and longitudinal center axes of the two connecting pieces merge into one another and lie in a duct plane parallel to the Z direction, and
an effective direction of the force generated between the two connecting pieces and the two receptacles lies in the duct plane.

5. The HVAC unit of claim 1, wherein the respective connecting piece extends outwardly from the sensor device and is conical on the outside and the respective receptacle of the air duct arrangement is conical on the inside.

6. The HVAC unit of claim 1, further comprising a separate guide element or an integral guide element disposed within the respective receptacle, which guides air from the air duct arrangement into the sensor device or from the sensor device into the air duct arrangement.

7. The HVAC unit of claim 1, wherein the sensor device is guided on the housing via a guide unit at least one of transversely to the Z-direction and in the Z-direction.

8. The HVAC unit of claim 1, wherein the two connecting pieces and the two receptacles are each formed identically to one another, such that the sensor device can be mounted on the housing of the HVAC unit in two positions, each rotated by 180° about the Z-direction.

9. The HVAC unit of claim 2, wherein:
the sensor device is attached to the housing via a poka-yoke unit that precludes incorrect mounting of the sensor device on the housing,
the poka-yoke unit is formed by at least one pin and at least one rib on the sensor device and at least one aperture for the at least one pin on the mounting bracket, and
in the case of correct mounting, the at least one pin engages unhindered in the at least one aperture and, in the case of incorrect mounting, the at least one rib prevents engagement between the at least one pin and the at least one aperture.

10. The HVAC unit of claim 1, wherein:
the sensor device is attached to the housing via a poka-yoke unit that precludes incorrect mounting of the sensor device to the housing, and
the poka-yoke unit is formed by one of the two connecting pieces with an associated one of the two receptacles is different from the other of the two connecting pieces with the other associated one of the two receptacles.

11. The HVAC unit of claim 1, wherein:
the housing includes at least two housing parts, each with a connecting surface,
the one housing part and the other housing part abut one another and are fixedly connected to one another by the respective connecting surfaces,
the air duct arrangement is formed at least in regions between the two mutually abutting connecting surfaces, and
the receptacles of the air duct arrangement are formed in the one housing part and the sensor device is attached to the one housing part.

12. The HVAC unit of claim 7, wherein the guide unit includes a rib cross.

13. The HVAC unit of claim 7, wherein the guide unit includes at least one guide rib.

14. The HVAC unit of claim 1, wherein the air duct arrangement further includes two air ducts coupled to the two receptacles for guiding air flow into and out of the sensor device via the interface provided by the two connecting pieces and the two receptacles.

15. A motor vehicle, comprising: an HVAC unit, the HVAC unit including:
a housing, a sensor device through which air is flowable and an air duct arrangement through which air is flowable,
the sensor device attached to the housing and airflow-connected to the air duct arrangement at an interface,
the interface provided by two connecting pieces of the sensor device aligned in a Z-direction and two receptacles of the air duct arrangement corresponding with the two connecting pieces,
wherein the two connecting pieces are disposed on the sensor device and the two receptacles of the air duct arrangement are disposed in the housing,
wherein a first connecting piece of the two connecting pieces engages in a first receptacle of the two receptacles at the interface to define a first airtight-connection, and a second connecting piece of the two connecting pieces engages in a second receptacle of the two receptacles to define a second airtight-connection, and
wherein the first connecting piece together with the first receptacle at the first airtight-connection directs the air from the air duct arrangement into the sensor device, and the second connecting piece together with the second receptacle at the second airtight-connection directs the air from the sensor device into the air duct arrangement.

16. The motor vehicle of claim 15, wherein the sensor device is clamped between a mounting bracket disposed on the housing and the interface in the Z-direction.

17. The motor vehicle of claim 15, wherein the sensor device is attached to the housing via a screw aligned in the Z-direction and is drawn towards the housing.

18. The motor vehicle of claim 15, wherein the respective connecting piece extends outwardly from the sensor device and tapers towards the respective receptacle of the air duct arrangement.

19. The motor vehicle of claim 15, wherein at least one of:
the HVAC unit further includes a guide element disposed within the respective receptacle that guides air from the air duct arrangement into the sensor device or from the sensor device into the air duct arrangement; and
the sensor device is guided on the housing via a guide unit at least one of transversely to the Z-direction and in the Z-direction.

20. The motor vehicle of claim 15, wherein the sensor device is attached to the housing via a poka-yoke unit that precludes incorrect mounting of the sensor device on the housing.

* * * * *